United States Patent
Denton

(10) Patent No.: US 11,262,976 B2
(45) Date of Patent: Mar. 1, 2022

(54) METHODS FOR COLLECTING AND MANAGING PUBLIC MUSIC PERFORMANCE ROYALTIES AND ROYALTY PAYOUTS

(71) Applicant: Levaughn Denton, Baisley Park, NY (US)

(72) Inventor: Levaughn Denton, Baisley Park, NY (US)

(73) Assignee: ZOPHONOS INC., Dover, DE (US)

( * ) Notice: Subject to any disclaimer, the term of this patent is extended or adjusted under 35 U.S.C. 154(b) by 36 days.

(21) Appl. No.: 16/928,779

(22) Filed: Jul. 14, 2020

(65) Prior Publication Data

US 2020/0341724 A1    Oct. 29, 2020

Related U.S. Application Data

(60) Division of application No. 16/848,437, filed on Apr. 14, 2020, now Pat. No. 11,068,234, which is a
(Continued)

(51) Int. Cl.
*G06F 3/16* (2006.01)
*G06F 21/00* (2013.01)
(Continued)

(52) U.S. Cl.
CPC ............ *G06F 3/165* (2013.01); *H04R 27/00* (2013.01); *G06F 21/00* (2013.01); *G06F 21/10* (2013.01);
(Continued)

(58) Field of Classification Search
CPC . G06F 3/16; G06F 3/165; G06F 3/167; G06F 21/00; G06F 21/10; G06F 21/15;
(Continued)

(56) References Cited

U.S. PATENT DOCUMENTS

| 5,668,884 A | 9/1997 | Clair, Jr. et al. |
| 7,991,171 B1 | 8/2011 | Snow |

(Continued)

FOREIGN PATENT DOCUMENTS

| EP | 1971035 B1 | 8/2014 | |
| WO | WO-2015175566 A1 * | 11/2015 | ............ G06F 21/10 |
| WO | 2016049130 A1 | 3/2016 | |

OTHER PUBLICATIONS

International Search Report, dated Jan. 29, 2019, for PCT Application No. PCT/US15/51638, International Filing Date of Sep. 23, 2015, consisting of 2 Pages.
(Continued)

*Primary Examiner* — Thang V Tran
(74) *Attorney, Agent, or Firm* — Gearhart Law LLC; David Postolski, Esq.

(57) ABSTRACT

Methods and apparatus, including software, for collecting and managing public music performance royalties and royalty payouts are described. On the listeners side, song/audio fingerprint data is collected and transmitted to the rights owner side, where the rights owner side verifies the song/audio fingerprint data, calculates royalty payments, and in some cases, automates the royalty payments. Public music performance royalty payments are based on the song/audio fingerprint data collected by listeners/clients, as well as business logic servers.

7 Claims, 12 Drawing Sheets

Related U.S. Application Data continuation-in-part of application No. 16/421,141, filed on May 23, 2019, now Pat. No. 10,656,906, which is a continuation-in-part of application No. 16/155,919, filed on Oct. 10, 2018, now abandoned, which is a continuation of application No. 14/862,304, filed on Sep. 23, 2015, now Pat. No. 10,127,005.

(60) Provisional application No. 62/054,286, filed on Sep. 23, 2014.

(51) Int. Cl.

| | | |
|---|---|---|
| *G06Q 20/40* | (2012.01) | |
| *H04R 29/00* | (2006.01) | |
| *H04R 27/00* | (2006.01) | |
| *H04L 67/12* | (2022.01) | |
| *H04S 7/00* | (2006.01) | |
| *H04B 1/00* | (2006.01) | |
| *G06F 21/10* | (2013.01) | |

(52) U.S. Cl.
CPC ........... *G06Q 20/40* (2013.01); *H04B 1/0003* (2013.01); *H04L 67/12* (2013.01); *H04R 29/00* (2013.01); *H04R 29/007* (2013.01); *H04R 2227/003* (2013.01); *H04R 2499/13* (2013.01); *H04S 7/40* (2013.01); *H04S 2400/15* (2013.01)

(58) Field of Classification Search
CPC ....... G06F 16/182; G06F 17/30; G06Q 20/00; G06Q 20/08; G06Q 20/0855; G06Q 20/40; G06Q 20/42; G06Q 20/401; G06Q 20/14; G06Q 20/145; G06Q 50/10; G06Q 50/18; G06Q 50/184; G06Q 10/00; H04R 27/00; H04R 29/00; H04R 29/007; H04R 2499/13; H04R 2227/003; H04B 1/003; H04L 67/12; H04S 7/40; H04S 2400/15
See application file for complete search history.

(56) References Cited

U.S. PATENT DOCUMENTS

| | | | |
|---|---|---|---|
| 8,073,160 | B1 | 12/2011 | Classen |
| 8,315,398 | B2 | 11/2012 | Katsianos |
| 8,452,432 | B2 | 5/2013 | Transeau |
| 8,594,319 | B2 | 11/2013 | Ho et al. |
| 8,645,993 | B2 | 2/2014 | Perry |
| 10,127,005 | B2 | 11/2018 | Denton |
| 10,157,434 | B2* | 12/2018 | Shanley ............... G06Q 50/184 |
| 10,656,906 | B2 | 5/2020 | Denton |
| 2004/0076305 | A1 | 4/2004 | Santiago |
| 2004/0240676 | A1 | 12/2004 | Hashimoto et al. |
| 2005/0160270 | A1 | 7/2005 | Goldberg et al. |
| 2006/0031551 | A1* | 2/2006 | Agresta ............ H04N 21/42201 709/231 |
| 2006/0067550 | A1 | 3/2006 | Puder et al. |
| 2006/0082458 | A1 | 4/2006 | Shanks et al. |
| 2007/0217623 | A1 | 9/2007 | Harada |
| 2009/0003620 | A1 | 1/2009 | McKillop et al. |
| 2009/0058611 | A1 | 3/2009 | Kawamura et al. |
| 2009/0076825 | A1 | 3/2009 | Bradford et al. |
| 2010/0329471 | A1 | 12/2010 | Dunn et al. |
| 2011/0087079 | A1 | 4/2011 | Aarts |
| 2011/0106673 | A1* | 5/2011 | Shanley ................. G06Q 40/02 705/30 |
| 2011/0134278 | A1 | 6/2011 | Chang et al. |
| 2011/0213720 | A1* | 9/2011 | Waid .................... G06Q 50/184 705/310 |
| 2011/0313555 | A1 | 12/2011 | Shoham et al. |
| 2012/0189140 | A1 | 7/2012 | Hughes |
| 2013/0044131 | A1 | 2/2013 | Milad |
| 2013/0064380 | A1 | 3/2013 | Mohowald |
| 2013/0294618 | A1 | 11/2013 | Lyubachev |
| 2014/0044269 | A1 | 2/2014 | Anderson |
| 2015/0171813 | A1 | 6/2015 | Ganatra |
| 2015/0281853 | A1 | 10/2015 | Eisner et al. |
| 2015/0287153 | A1* | 10/2015 | Kankanala ........... G06Q 50/184 705/310 |
| 2015/0358730 | A1 | 12/2015 | Kirsch et al. |
| 2016/0150338 | A1 | 5/2016 | Kim et al. |
| 2016/0379613 | A1 | 12/2016 | Liu |
| 2017/0116694 | A1* | 4/2017 | Gabie .................. G06Q 50/188 |
| 2019/0050194 | A1 | 2/2019 | Denton |
| 2019/0318060 | A1* | 10/2019 | Brenner ................. G06F 21/10 |
| 2020/0167385 | A1* | 5/2020 | Jung ....................... G06F 16/38 |

OTHER PUBLICATIONS

International Preliminary Report on Patentability, dated Mar. 28, 2017, for PCT Application No. PCT/US15/51638, International Filing Date of Sep. 23, 2015, consisting of 7 Pages.

Written Opinion of the International Searching Authority, dated Jan. 29, 2016, for PCT Application No. PCT/US15/51638, International Filing Date of Sep. 23, 2015, consisting of 6 Pages.

International Search Report dated Sep. 16, 2020 issued in PCT/US2020/042927.

\* cited by examiner

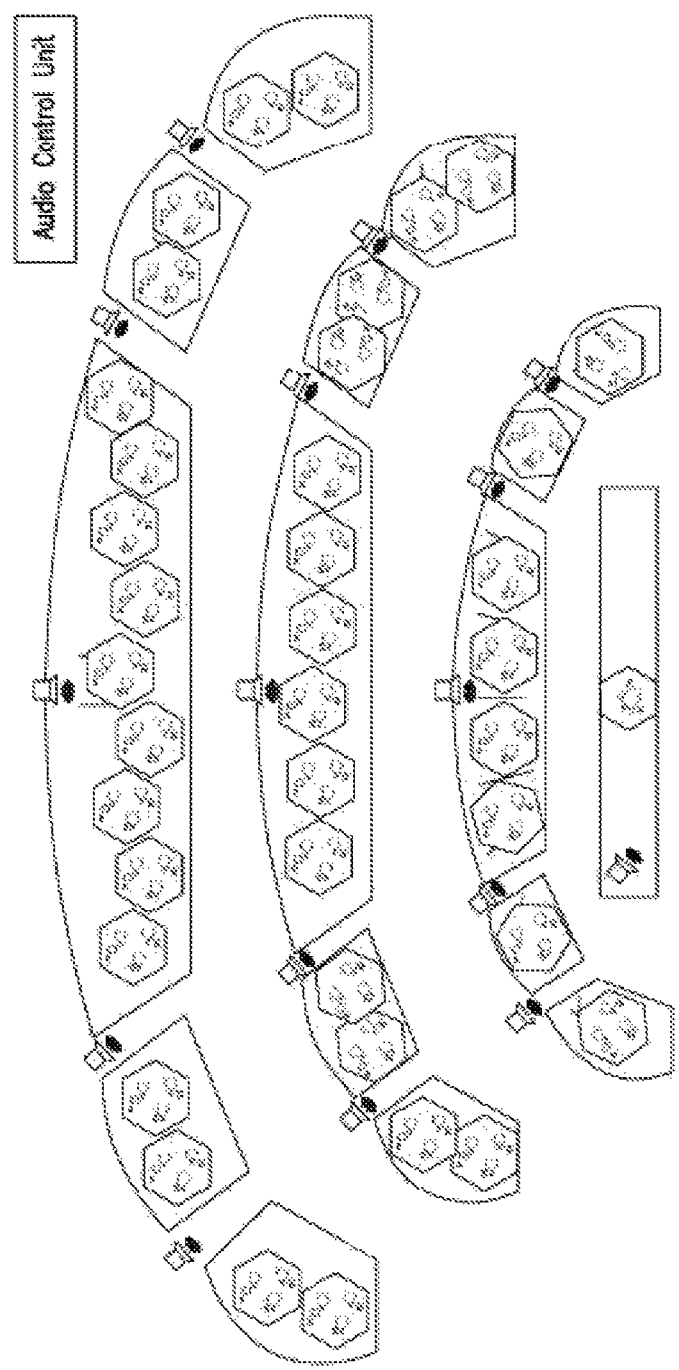

METHODS FOR COLLECTING AND MANAGING PUBLIC MUSIC PERFORMANCE ROYALTIES AND ROYALTY PAYOUTS

CROSS-REFERENCE TO RELATED APPLICATIONS

This application is a Divisional of U.S. Non-Provisional application Ser. No. 16/848,437 filed Apr. 14, 2020, which is a U.S. Continuation-In-Part patent application of U.S. Non-Provisional patent application Ser. No. 16/421,141 filed on May 23, 2019, which is a U.S. Continuation-In-Part patent application of U.S. Non-Provisional patent application Ser. No. 16/155,919, filed Oct. 10, 2018, which is a Continuation Application of U.S. Non-Provisional patent application Ser. No. 14/862,304, filed Sep. 23, 2015, and patented as U.S. Pat. No. 10,127,005 on Nov. 13, 2018, which claims priority from U.S. Provisional Patent Application No. 62/054,286, filed on Sep. 23, 2014, the contents of which are hereby fully incorporated by reference.

FIELD OF THE EMBODIMENTS

The invention and its embodiments relate to methods for monetizing public music performances. Specifically, the invention and its embodiments relate to methods that provide an easy and streamlined way for music publishing and public performance companies to source and manage royalties.

BACKGROUND OF THE EMBODIMENTS

Historically, music publishers generate revenue by printing copies of sheet music and distributing and selling the printed copies to local music stores. Today, music publishers generate revenue through the marketing and administration of rights to songwriters/lyricists, composers, and/or publishers (collectively referred to as "rights owners"). The financial exploitation of music from recordings (e.g., mechanical royalties), from broadcast or live performances (e.g., performance royalties) and other license fees associated with musical samples, film and miscellaneous creative work, represents the heart of music publishing. As a result of having millions of rights owners spread across the globe, it is impractical for commercial licensees to send separate payments to thousands of rights owners and/or copyright holders. Due to this impracticality, Performing Rights Organizations (PROs) were formed to help streamline the process.

Typically, the rights owners contract with PROs that serve as an intermediary between commercial users and rights owners. For instance, the American Society of Composers, Authors and Publishers (ASCAP) is a PRO that was launched in part to force venues to pay copyright holders. Other PROs, such as the Society of European Stage Authors and Composers (SESAC) and Broadcast Music, Inc. (BMI), were launched for similar reasons. Typically, PROs collect between $2-3 billion dollars from commercial users. About 15% of total revenue generated is from performances in clubs, hotels, arenas, concert halls, and amusement parks and approximately 25% of the total revenue comes from international organizations. When foreign organizations are involved, money is passed through reciprocal agreements with collection agencies overseas. Sub-publishers on foreign territories maximize royalties from oversea sources, which helps the original rights owners in the United States.

When musical entertainment happens on a regular basis (e.g., in live concert halls), venue staff file and upload cue sheets that detail performances. The reports are spot-checked by PROs periodically to confirm their accuracy. However, since there are hundreds of billions of performances tracked annually, spot-checking, albeit infrequent, can be tedious. At venues that offer musical entertainment, only occasionally performance fees are collected from the promoter or producer renting the space or the owner. Manually generated reports/updates and spot-checking of the reports is not ideal and can lead to human error. Thus, a solution is needed that eliminates the need for reliance on manually generated reports/updates and spot-checking of these reports.

Review of Related Technology:

Line6, Inc. has created a 'smart mixing system' for non-wearable ubiquitous computing devices that enables wireless and touchscreen control of live sound system components. This is accomplished via a wired connection between standard audio hardware and a proprietary physical interface. While this system integrates and controls live sound system components via touchscreen devices, it unfortunately relies on audio engineers to operate it, and does not incorporate a listener-centric way to autonomously solve audio issues experienced by an audience.

U.S. Pat. No. 5,668,884 pertains to an audio enhancement system and method of use with a sound system for producing primary sound from at least one main loudspeaker located at a main position. The audio enhancement system comprises at least one wireless transmitter, time delay circuitry, and plural augmented sound producing subsystems. Each sound subsystem is a portable unit arranged to be carried by a person located remote from the main loudspeaker and includes a wireless receiver and an associated transducer device, e.g., a pair of stereo headphones. The transmitter broadcasts an electrical signal which is representative of the electrical input signal provided to the main loudspeaker. The broadcast signal is received by the receiver and is demodulated and amplified to drive the transducer so that it produces augmented sound substantially in synchronism with the sound arriving from the main loudspeaker. To achieve that end the time delay circuitry delays the electrical signal which is provided to the transducer for a predetermined period of time corresponding generally to the time period it takes for the primary sound to propagate through the air from the main loudspeaker to the remote location at which the person is located.

U.S. Pat. No. 7,991,171 pertains to a method and apparatus for processing an audio signal in multiple audio frequency bands while minimizing undesirable changes in tonal qualities of the audio signal by determining an initial gain adjustment factor for each audio frequency band resulting from the application of an audio processing technique. A final gain adjustment factor for each band is selected from a corresponding set of weighted or unweighted initial gain adjustment factors. The set of initial gain adjustment factors from which the final gain adjustment factor for a specified audio frequency band is obtained is derived from other audio frequency bands that have the frequency of the specified band as a harmonic frequency. Changes in audio signal level within one audio frequency band thereby affect the signal level of harmonic frequencies to decrease relative changes in volume between a fundamental frequency and its harmonics.

U.S. Pat. No. 8,315,398 pertains to a method of adjusting a loudness of an audio signal may include receiving an electronic audio signal and using one or more processors to process at least one channel of the audio signal to determine a loudness of a portion of the audio signal. This processing may include processing the channel with a plurality of approximation filters that can approximate a plurality of auditory filters that further approximate a human hearing system. In addition, the method may include computing at least one gain based at least in part on the determined loudness to cause a loudness of the audio signal to remain substantially constant for a period of time. Moreover, the method may include applying the gain to the electronic audio signal.

U.S. Pat. No. 8,452,432 pertains to a user-friendly system for real time performance and user modification of one or more previously recorded musical compositions facilitates user involvement in the creative process of a new composition that reflects the user's personal style and musical tastes. Such a system may be implemented in a small portable electronic device such as a handheld smartphone that includes a stored library of musical material including original and alternative versions of each of several different components of a common original musical composition, and a graphic user interface that allows the user to select at different times while that original composition is being performed, which versions of which components are to be incorporated to thereby create in real time a new performance that includes elements of the original performance, preferably enhanced at various times with user selected digital sound effects including stuttering and filtering. The system may also optionally comprise a visualizer module that renders a visual animation that is responsive to at least the rhythm and amplitude of the system's audio output, not only for entertainment value but also to provide visual feedback for the user.

U.S. Pat. No. 8,594,319 pertains to methods and apparatuses for adjusting audio content when more multiple audio objects are directed toward a single audio output device. The amplitude, white noise content, and frequencies can be adjusted to enhance overall sound quality or make content of certain audio objects more intelligible. Audio objects are classified by a class category, by which they can be assigned class specific processing. Audio objects classes can also have a rank. The rank of an audio object's class is used to give priority to or apply specific processing to audio objects in the presence of other audio objects of different classes.

United States Patent Publication No. 2007/0217623 pertains to a real-time processing apparatus capable of controlling power consumption without performing complex arithmetic processing and requiring a special memory resource. The real-time processing apparatus includes an audio encoder that performs a signal processing in real time on an audio signal, a second audio encoder that performs the signal processing with a smaller throughput in real time on the audio, an audio execution step number notification unit that measures step number showing a level of the throughput in the signal processing by operating the 1st audio encoder or second audio encoder, and an audio visual system control unit that executes control so that the first audio encoder operates when the measured step number is less than a threshold value provided beforehand and the second audio encoder operates when the step number is equal to or greater than the threshold value.

United States Patent Publication No. 2011/0134278 pertains to an image/audio data sensing module incorporated in a case of an electronic apparatus. The image/audio data sensing module comprises: at least one image sensor, for sensing an image datum; a plurality of audio sensors, for sensing at least one audio datum; a processor, for processing the image datum and the audio datum according to a control instruction set to generate a processed image data stream and at least one processed audio data stream, and combining the processed image data stream and the processed audio data stream to generate an output data stream following a transceiver interface standard; a transceiver interface, for receiving the control instruction set and transmitting the output data stream via a multiplexing process; and a circuit board, wherein the image sensor, the audio sensors and the transceiver interface are coupled to the circuit board, and the processor is provided on the circuit board.

United States Patent Publication No. 2013/0044131 pertains to a method for revealing changes in settings of an analog control console, the method comprising: receiving a captured image of the analog control console; creating a composite image by superimposing the captured image and a live image of the analog control console; and displaying the composite image.

United States Patent Publication No. 2013/0294618 pertains to a method and devices of sound volume management and control in the attended areas. According to the proposed method and system variants the sound reproducing system comprises: sounding mode appointment device, central station for audio signal transmittance; one or more peripheral stations for audio signal reception and playback; appliance for listener's location recognition; computing device for performing calculation concerning sounding parameters at the points of each listener's location and for performing calculation of controlling parameters for system tuning. The system can be operated wirelessly and can compose a local network.

Various methods for monetizing public music performances are known in the art. However, their structure and means of operation are substantially different from the present invention. What is needed is a method for monetizing public music performances that provides an easy, streamlined way for music publishing and public performance companies to source and manage royalties.

SUMMARY OF THE EMBODIMENTS

The present invention and its embodiments relate to methods for monetizing public music performances. Specifically, the invention and its embodiments relate to methods that provide an easy and streamlined way for music publishing and public performance companies to source and manage royalties.

A first embodiment of the system is described. The system includes an audio control source and at least one cluster of at least one computing device. The at least one computing device includes a sound sensing mechanism configured to sense a noise. The sound sensing mechanism includes an omnidirectional transducer, an ultrasonic transducer, an infrasonic transducer, or a microwave transducer. Moreover, the sensed noise includes infrasonic or ultrasonic soundwaves. The at least one computing device also includes a wireless transceiver configured to wirelessly transmit and receive data from the audio control source, and at least one output device. The at least one output device includes a power source for operating the output device, a speaker for outputting sound, and a communication mechanism for receiving electronic information from the audio control source.

The audio control source is in electronic communication the at least one cluster and the at least one output device. The audio control source includes a memory and a processor. The memory contains computer-executable instructions for connecting to the at least one cluster and varying an output of the at least one output device. The processor executes the computer-executable instructions of the memory.

The computer-executable instructions include: identifying one or more sounds within the noise, isolating the one or more sounds, and determining if one or more of the one or more sounds includes a frequency and an intensity outside of a predetermined threshold. The predetermined threshold equates to a frequency and an intensity determined to pose a risk of harm to a user's hearing capabilities. If the one or more of the one or more sounds includes the frequency and the intensity outside of the predetermined threshold, the computer-executable instructions further include notifying a user, via a notification, that one or more of the one or more sounds includes the frequency and the intensity outside of the predetermined threshold.

If the one or more of the one or more sounds includes the frequency and the intensity outside of the predetermined threshold, the computer-executable instructions further include: determining if the system is in an auto-adjust mode. In response to a determination that the system is in the auto-adjust mode, the computer-executable instructions further include altering the one or more of the one or more sounds so that the frequency and the intensity do not fall outside of the predetermined threshold. In response to a determination that the system is not in the auto-adjust mode, the computer-executable instructions further include outputting the one or more sounds on the at least one output device. The one or more sounds comprise sound fingerprints and sound characteristics. The at least one output device may include a display and/or a speaker, among other examples.

In some examples, the computer-executable instructions further include determining if the one or more of the one or more sounds includes an amplitude outside of a predetermined threshold. In this scenario, if the one or more of the one or more sounds includes the frequency, the intensity, and the amplitude outside of the predetermined threshold, the computer-executable instructions further include notifying the user, via another notification, that one or more of the one or more sounds includes the frequency, the intensity, and the amplitude outside of the predetermined threshold.

If the one or more of the one or more sounds includes the frequency, the intensity, and the amplitude outside of the predetermined threshold, the computer-executable instructions further include determining if the system is in the auto-adjust mode. In response to a determination that the system is in the auto-adjust mode, the computer-executable instructions further include altering the one or more of the one or more sounds so that the frequency, the intensity, and the amplitude do not fall outside of the predetermined threshold. In response to a determination that the system is not in the auto-adjust mode, the computer-executable instructions further include outputting the one or more sounds on the at least one output device. In some examples, the computer-executable instructions further include steps, such as: panning the sensed noise and/or equalizing the sensed noise, among others.

The system may also include an interfacing mechanism. The interfacing mechanism may include a network adapter configured to transmit and receive electronic information through both wired and wireless communication and at least one input mechanism. The at least one input mechanism is configured to manipulate the interfacing mechanism and vary the output of the at least one output device.

A second embodiment of the instant invention describes a method of altering sensed noise prior to outputting the sensed noise. The method includes providing at least one audio control source and providing at least one cluster of at least one computing device. The at least one computing device includes a sound sensing mechanism configured to sense a noise, a wireless transceiver configured to wirelessly transmit and receive data from the audio control source, and at least one output device. The sound sensing mechanism is an omnidirectional transducer, an ultrasonic transducer, an infrasonic transducer, or a microwave transducer, among others not explicitly listed herein. The sensed noise includes infrasonic or ultrasonic soundwaves, among others not explicitly listed herein.

The at least one output device includes a power source for operating the output device, a speaker for outputting sound, and a communication mechanism for receiving electronic information from the audio control source. The audio control source is in electronic communication the at least one cluster and the at least one output device. The audio control source includes a memory and a processor. The memory contains computer-executable instructions for connecting to the at least one cluster and varying an output of the at least one output device. The processor executes the computer-executable instructions.

The method further includes: isolating the one or more sounds and determining if one or more of the one or more sounds includes a frequency and an intensity outside of a predetermined threshold. The predetermined threshold equates to a frequency and an intensity determined to pose a risk of harm to a user's hearing capabilities. If the one or more of the one or more sounds includes the frequency and the intensity outside of the predetermined threshold, the method further includes notifying a user, via a notification, that one or more of the one or more sounds includes the frequency and the intensity outside of the predetermined threshold.

If the one or more of the one or more sounds includes the frequency and the intensity outside of the predetermined threshold, the method further includes determining if the system is in an auto-adjust mode. In response to a determination that the system is in the auto-adjust mode, the method further includes altering the one or more of the one or more sounds so that the frequency and the intensity do not fall outside of the predetermined threshold. In some examples, the altering of the one or more of the one or more sounds so that the frequency and the intensity does not fall outside of the predetermined threshold is performed automatically. In response to a determination that the system is not in the auto-adjust mode, the method further includes outputting the one or more sounds on the at least one output device. The one or more sounds comprise sound fingerprints and/or sound characteristics, among other features and characteristics. The at least one output device is a display or a speaker, among other devices.

In some examples, method may further include determining if the one or more of the one or more sounds includes an amplitude outside of a predetermined threshold. If the one or more of the one or more sounds includes the frequency, the intensity, and the amplitude outside of the predetermined threshold, the method may further include notifying the user, via another notification, that one or more of the one or more sounds includes the frequency, the intensity, and the amplitude outside of the predetermined threshold.

If the one or more of the one or more sounds includes the frequency, the intensity, and the amplitude outside of the predetermined threshold, the method may further include: determining if the system is in the auto-adjust mode. In response to a determination that the system is in the auto-adjust mode, the method may further include altering the one or more of the one or more sounds so that the frequency, the intensity, and the amplitude do not fall outside of the predetermined threshold. In response to a determination that the system is not in the auto-adjust mode, the method may further include outputting the one or more sounds on the at least one output device.

The at least one computing device further includes: an interfacing mechanism that includes a network adapter configured to transmit and receive electronic information through both wired and wireless communication and at least one input mechanism configured to manipulate the interfacing mechanism and vary the output of the at least one output device.

A third embodiment of the instant invention describes a system for collecting and managing public music performance royalties and royalty payouts. The system includes a device associated with a user, a database comprising information associated with a musical work, a business logic server communicatively coupled to a rules, rights and policy server, and a rights owner server communicatively coupled to the business logic server and the rules, rights and policy server. The device is a smart device, a wearable device, or an IoT device. The information of the database includes audio fingerprint recognition information, licensing grant information, performance information, song catalog information, song ownership information, and/or a location or a jurisdiction associated with a royalty payment for the data units.

The business logic server is configured to: receive data units associated with the musical work from the device associated with the user. Each of the data units are selected from the group consisting of: song information, information regarding whether a song was sung, information regarding whether a song was played live, information regarding whether a song was recorded, information regarding a time of the data unit, and/or information regarding a location of the data unit. The business logic server is further configured to: receive an authorization from the user to share the data units with a third party administrator. In examples, the authorization is an opt-in agreement. The business logic server is further configured to: map the data units to the database to identify a rights owner of the data units and verify the rights owner. In an example, the verification of the rights owner comprises mobile-to-mobile checks. In another example, the verification of the rights owner comprises verification by the third party administrator.

The business logic server is further configured to map the data units to the rules, rights, and policy server comprising copyright laws of a territory, verify compliance with the copyright laws of the territory, and transmit a verification message of the rights owner server to facilitate the royalty payment to the rights owner and a copyright holder. In examples, the copyright holder is a music producer, a songwriter, a recording artist and/or another rights owner or holder (e.g. a publisher). In some examples, the songwriter is the rights owner, but may assign his/her rights to a publishing entity.

In another scenario, the information of the database comprises the performance information. In this example, the business logic server is further configured to map the data units to the performance information to identify a non-musical entity associated with the data units. The non-musical entity is a venue commercializing musical works. The business logic server is further configured to verify the non-musical entity and transmit another verification message to the rights owner server to facilitate the royalty payment to the non-musical entity. The payment to the rights owner, the copyright holder, and/or the non-musical entity are based on the data units, compliance with the copyright laws of the territory, and the performance rights associated with the musical work. The rights owner server is further configured to generate royalty statements based on the royalty payment.

In general, the present invention succeeds in conferring the following benefits and objectives.

It is an object of the present invention to provide methods for managing public music performance royalties.

It is an object of the present invention to provide methods for managing public music royalty payouts.

It is an object of the present invention to provide methods for monetizing public music performances.

It is an object of the present invention to provide method for monetizing public music performances that are easy and streamlined to allow music publishing and public performance companies to source and manage royalties.

BRIEF DESCRIPTION OF THE DRAWINGS

FIG. 7C depicts an illustrated embodiment of the present invention located in an outdoor stadium, according to at least some embodiments described herein.

DESCRIPTION OF THE PREFERRED EMBODIMENTS

Figure 1:
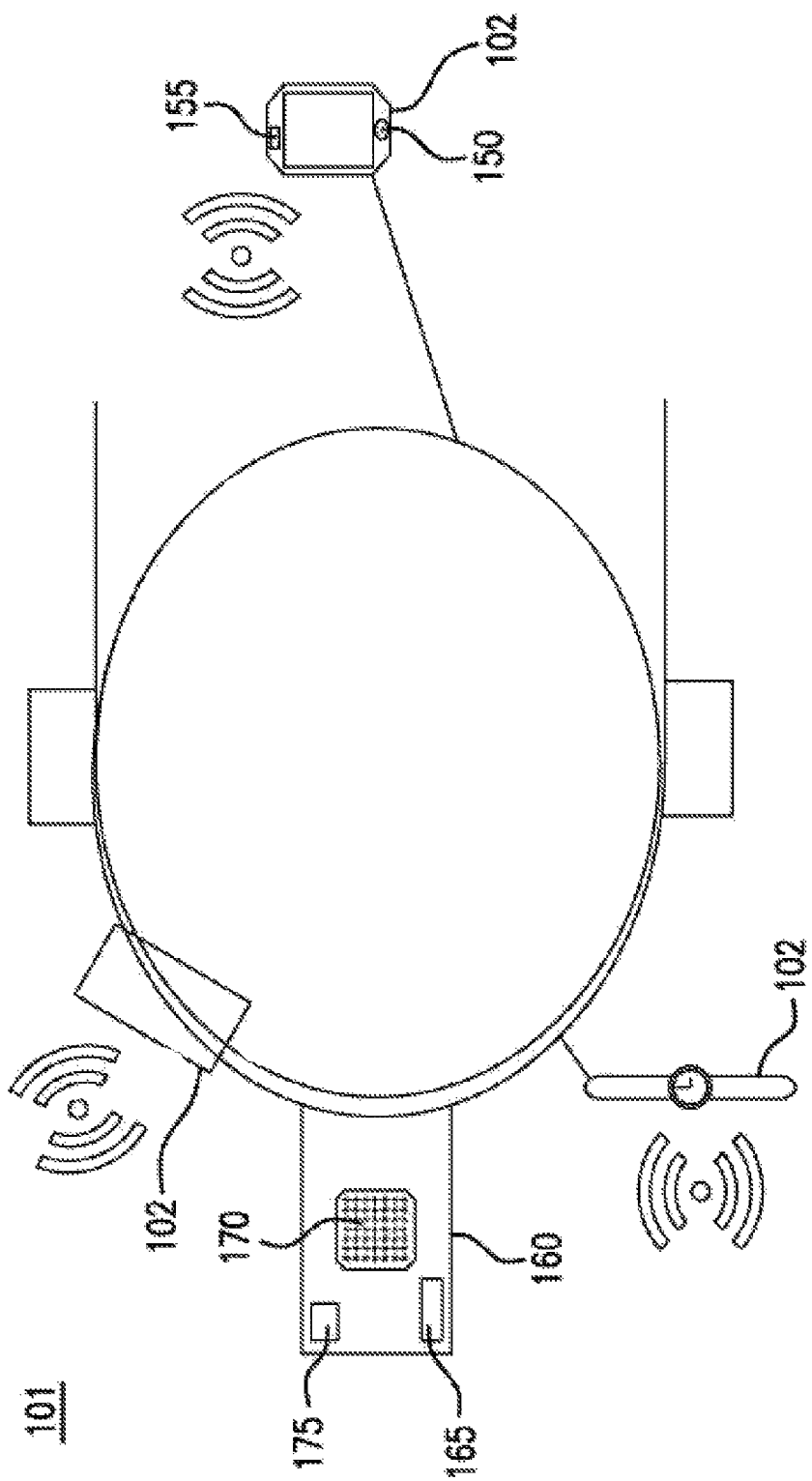
FIG. 1 depicts a schematic view of a one cluster with some interfaced devices, according to at least some embodiments described herein.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As a threshold matter, it should be noted that whenever the phrases "microphone" or "microphone-equipped" are used, it is intended to mean any device that is capable of detecting sound, not merely microphones. For example, a high-performance low frequency antenna connected to a software-defined radio may be used to input sound observations into the system, or a piezo-electric diagram may be used to measure the vibrations the correspond to a given sound. These examples are provided to give greater clarity as to what the term "microphone" should be interpreted as, and not construed as a limiting example.

The system of the present invention operates by integrating clusters of various computing devices and wearable computers with sound management techniques and methods so that various sound "fingerprints" can be developed and used to visualize how sound is being perceived in micro-areas within a larger venue. In various embodiments, the system of the present invention can be integrated into an individual's home, vehicle audio system, concert venues, and other locations where sound is played. In addition, the system's components allow for the present invention to be scaled to accommodate sound management and monitoring control within the largest of venues such as stadiums and other sports arenas.

Due to the devices that are integrated into the system having the ability to sense the frequency and magnitude of audio signals, a sound or audio fingerprint (summary) can be generated from deterministic methods. These fingerprints are then communicated to an audio control source and can subsequently be processed and used to communicate with external applications and things such as third-party sound databases. However, the purpose of this system is not to be confused. In addition to the sound fingerprinting ability of the present invention, it is also capable of utilizing a series of methods to sense and control audio output in various venues.

In an alternative embodiment, the present invention is located in a train or airport station that has an intercom system that functions poorly when noisy crowds are present. If an audio control source within these facilities is able to autonomously collect audio data via a series of integrated devices, then with the present invention, the same audio control source can adjust system outputs accordingly in order to make important intercom announcements intelligible. In yet another embodiment, a user can enter in EQ parameters in their integrated computing device to ensure that both the audio perceived by them, and the audio perceived by their device is in accordance with some predetermined parameters/settings. While many short-range wireless technologies can be used with the present invention, preferably one or more of the following technologies will be used: ANT+, Bluetooth, Bluetooth Low Energy, versions 4.1, 4.2, and 5.0, cellular, IEEE 802.15.4, IEEE 802.22, 802.11ax (i.e. Wi-Fi 6), 802.11a/b/g/n/ac/ax, 802.15.4-2006, ISA 100a, Infrared, ISM (band); NFC, RFID, WPAN, UWS, WI-FI, Wireless HART, Wireless HD/USB, ZigBee, or Z-wave.

In yet another preferred embodiment, various in-ear systems may be integrated into the present invention, software-defined and/or cognitive-defined based in-ear transceivers can be used to wirelessly communicate with an audio control source and thus, the output of such an in-ear monitor can be autonomously adjusted after sensing audio output. A given output can be adjusted according to what is sensed within specified location or what is sensed at external clusters.

Similarly to a software-defined and/or cognitive-defined based in-ear transceivers, an in-ear monitor system for use with the present invention will preferably comprise hardware such as, earphones, at least one body pack receiver, at least one mixer and at least one transmitter. These functions can also be adjusted and controlled via the audio control source of the present invention.

According to an embodiment, the functions of the present invention include sensing and isolating frequency bands associated with musical instruments/human voices in the following order: midrange, highs, and lows. According to an embodiment, the functions further include separating like frequencies (panning). According to an embodiment, the functions additionally include balancing the volume, controlling the dynamic range of the frequencies sensed (compression), performing subtractive and additive equalization, and/or adding audio effects to provide additional depth and texture.

Loud noises can often lead to stress and hearing loss. For example, certain frequencies and volumes can cause stress in pets, and loud music and other forms of loud sounds have put approximately 1.1 billion young people at risk of suffering from hearing loss. Furthermore, military veterans are 30% more likely to suffer from severe hearing loss than non-veterans. In fact, according to the DoD's Hearing Center for Excellence (HCE), hearing loss is the most-widespread injury among returning veterans, driving hearing loss payments to exceed $2 billion in 2016. The present invention provides for an interdisciplinary and technologically advanced approach to hearing loss prevention.

It is important to note that noise pollution not only produces negative health outcomes for humans, but also, can produce negative outcomes for pets. Loud noises and obtrusive, artificial light negatively affect pets such as cats and dogs, and can eventually lead to abnormal behaviors, like excessive whining, trembling, barking and panting. These behaviors are a result of the pets trying to cope with the stress tied to phenomena within their environment, and if left unchecked, can cause panic disorders such as, e.g., separation anxiety, which is not healthy for both pet owners and pets. It is therefore an object of the present invention to provide a method wherein at least one sound and/or light sensing device can be affixed or integrated into a pet wearable (e.g. dog collar).

Hearing loss can be considered an inevitable cost of military exercises and war. However, real-time alerts using mobile devices creates an opportunity to implement preventative measures, ultimately reducing hazardous exposure time and thus injury. Study considerations include, data sets, hearing loss incidents among veterans (on the rise), current preventative measures, gear, and equipment such as jet engines and other inherently noisy machinery.

In summary, various embodiments of the present invention are in response to the DoD commitment to reduce the number of military personnel that suffer from hearing loss injury by 1) analyzing hazardous sounds in real-time 2) alerting service members using wearable mobile devices (new preventative technique).

According to an embodiment, the present invention provides for a mobile cluster-based apparatus that analyzes, reports, and controls outputs based on a range of inputs over a swath of frequency bands, with distinct applications including sound output control, hazardous millimeter-wave, blue light or RF detection and reporting, and ultrasonic and infrasonic wave detection and reporting. In a blue light sensing application, a wearable in close proximity to a user's retina (e.g. located on a collar of a smart jacket) can measure prolonged blue light retina exposure and report the issue back to the user.

According to an embodiment, the apparatus is configurable and uses standard computing devices, such as wearables, tablets, and mobile phones, to measure various frequency bands across multiple points, allowing a single user to visualize and adjust sound output, and in some cases, detect and report hazardous signals.

Each year, sound companies spend billions of dollars on audio technologies and audio research to find new ways to improve audio quality in performance settings. Proposed is an apparatus and method that creatively tackles the issue of poor audio quality and sound perception across various spaces by integrating consumer-based mobile devices, wearable computers and sound management systems. The ubiquitous computing devices in this method and apparatus senses soundwaves, associates sensed audio levels with specific clusters (locations), predicts whether or not an audio-related issue is likely to occur within a specific cluster (for instance, predicts if an echo is likely to occur), and adjusts audio intensity (and related EQs) accordingly to improve audio output quality.

Key features of the Mobile Cluster-Based Audio Adjusting Method and Apparatus include:
User/listener-based sound management and control
Scalable platform that can incorporate future tech—that is, new functionalities can be added because the method and apparatus is designed to seamlessly integrate additional components including, but not limited to, software applications such as a 'sound preference' application that sets user-based sound perception settings on a mobile device or wearable computer.
Integrates with existing audio hardware and software—such as in-ear systems, mixer boards and other related audio consoles
Autonomous audio sensing
Can be configured, manufactured and sold across different industries (e.g. automobile or audio electronic industries)
Can be used in sound fingerprint and music publishing/performance applications (e.g. in a performance venue, fingerprint data can be sent directly to music publishing entities from the described clusters
Can interface with various communication offerings such as e-mail, SMS, and visual screens (for instance, communicative updates can be sent with sensed audio measurements. A specific example—an SMS that reads a "too loud in section A"/cluster A)
Can support a fixed or unfixed number of "sensing units"

Referring to FIG. 1, an embodiment of one cluster 101 of the present invention with some interfaced devices. Specifically, three embodiments of at least one computing device 102 are shown; wearable glasses, wearable watch, and a smartphone. It should be noted that while these three devices are listed as exemplary examples, any device with a sound sensing mechanism 150 and a way to transmit any recorded data is suitable for use as one of said at least one computing devices 102. According to an embodiment, the sound sensing apparatus may be an omnidirectional transducer, an ultrasonic transducer, an infrasonic transducer, a microwave transducer, and/or any other suitable sound sensing apparatus, while maintaining spirit of the present invention. The sound sensing mechanisms of at least one computing device 102 will be able convert perceived sounds into electronic signals so that the recorded information may be transmitted to neighboring clusters 101, or an audio control source (See FIG. 3), as desired. This data will be transmitted using either one or a combination of short-range wireless technologies, namely ANT+, Bluetooth, Bluetooth Low Energy, versions 4.1, 4.2, and 5.0, cellular, IEEE 802.15.4, IEEE 802.22, 802.11ax (i.e. Wi-Fi 6), 802.11a/b/g/n/ac/ax, 802.15.4-2006, ISA 100a, Infrared, ISM (band); NFC, RFID, WPAN, UWS, WI-FI, Wireless HART, Wireless HD/USB, ZigBee, or Z-wave. Preferably, transducers integrated into these computing devices have an output signal that is fed into the input of an analog-to-digital converter ("ADC") and can incorporate software and cognitive-defined radios to broaden the selection of compatible wireless communication interfaces and limit radio component footprints. According to an embodiment, the at least one computing device 102 includes one or more wireless transceivers 155.

Figure 2:
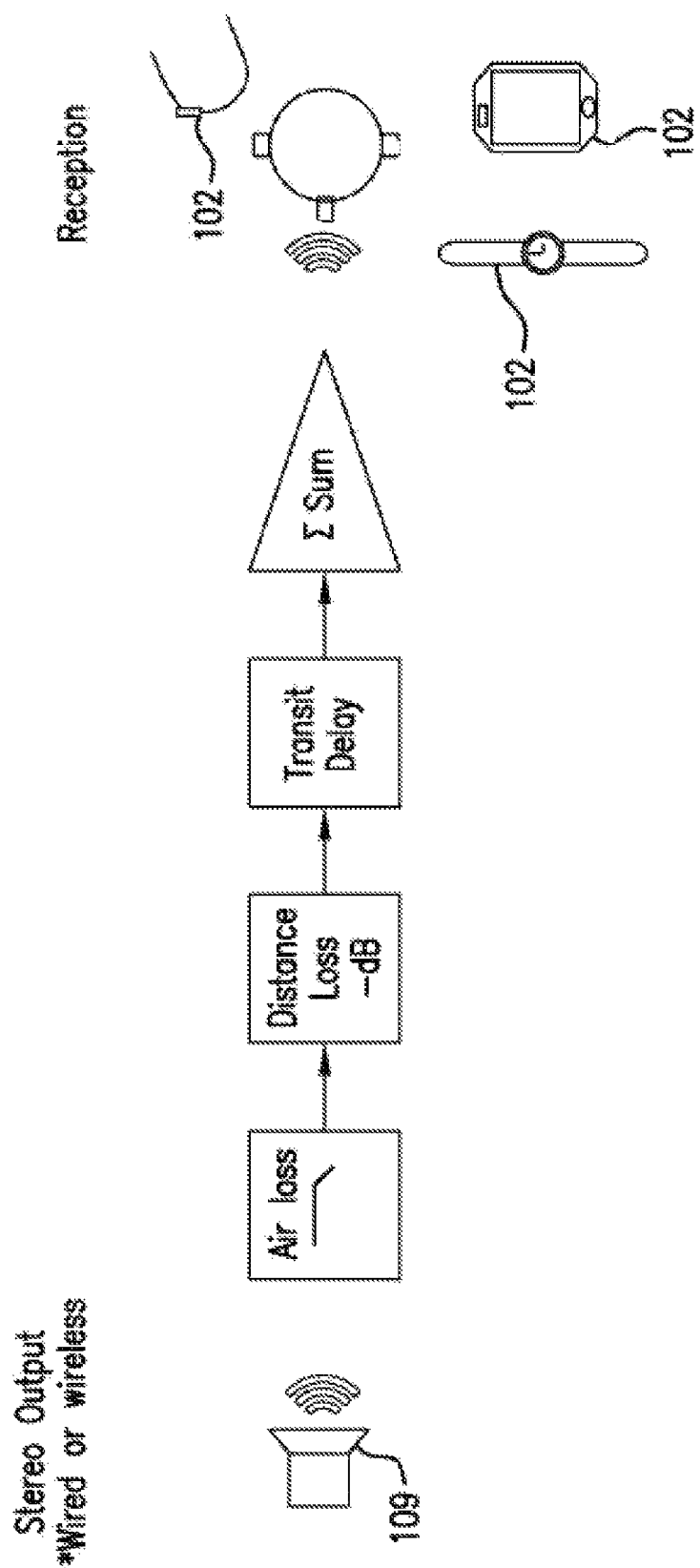
FIG. 2 depicts a schematic view of how interfaced devices create a sound fingerprint, according to at least some embodiments described herein.

FIG. 2 shows a schematic view of how interfaced devices create a sound fingerprint. The sound transmission of the audio energy 109 sensed by the at least one computing device 102 propagates through air and is received by at least one computing device 102 using the transmission path outlined in FIG. 2.

Assuming that FIG. 2 depicts audio transmission in an indoor setting, at specified time intervals, each computing device measures the sound pressure level (SPL) and sound power level (SWL):

$$SPL = SWL + 10 \log\left[\frac{Q_\theta}{4\pi r^2} + \frac{4}{R_C}\right]$$

Where:
SPL=Sound pressure level dB $SWL=$Sound power level$=10 \log_{10}(W/W_{ref})$ W is the total sound power radiated from a source with respect to a reference power ($W_{ref}$) dBW re $10^{-12}$ Watts.
r=distance from source m
$Q_\theta$=directivity factor of the source in the direction of r
S=total surface area of a room m$^2$
$\alpha_{av}$=average absorption coefficient in a room $$R_C = \text{room constant} = \frac{S\alpha_{av}}{1 - \alpha_{av}} m^2$$

Over time, each computing device in FIG. 2 detects differences in pressure (i.e. change in pressure vs. time) and converts the differences into an electrical signal. A Fast Fourier Transform is implemented (locally or in a cloud) to measure the relative amplitudes of the frequencies 'sensed' and to perform other frequency domain analyses.

It is important to note that in any given indoor environment, $R_C$, $\alpha_{av}$, and S can be predetermined and made available to each computing device, approximated or deemed negligible. Also note that each computing device in FIG. 2 has a microphone. Computing devices may also obtain sound observations via a high-performance low frequency antenna.

Figure 3:
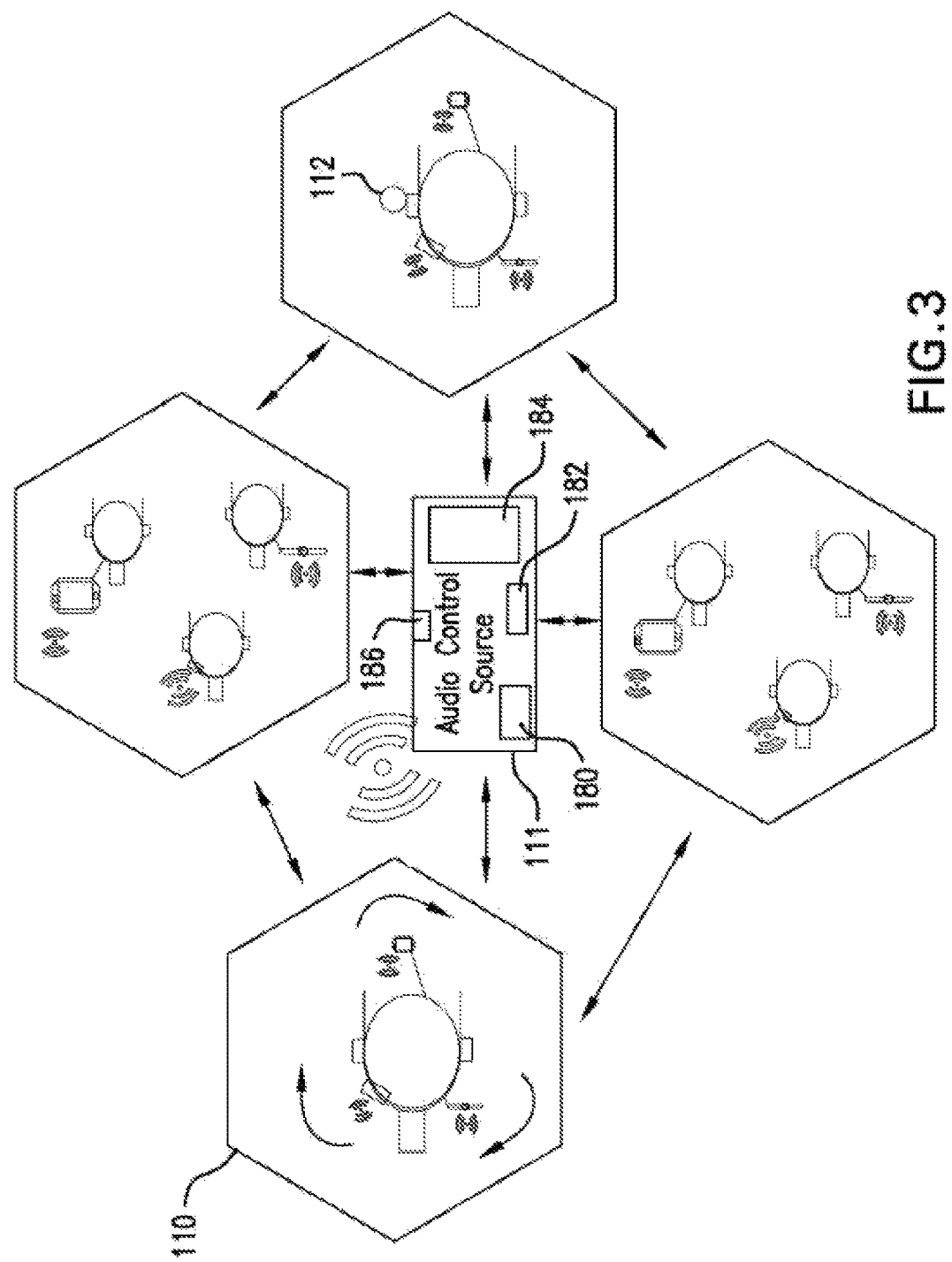
FIG. 3 depicts an illustration of a system engaging in inter-cluster, cluster-to-audio control source, and cluster-to-cluster data sharing, according to at least some embodiments described herein.

Turning to FIG. 3 an illustration of an embodiment of the system of the present invention engaging in intra-cluster, cluster-to-audio control source; and cluster-to-cluster data sharing. Here, each cluster has a given location 110 (i.e. specified location) to accurately isolate and associate the sensed data. In one embodiment, the present invention is able to adjust a given output device 160 based on its proximity to a given location 110 of a cluster. In alternative embodiments, output devices 160 can be adjusted based on their proximity to more than one cluster. Devices in each cluster can either communicate directly to each other or an audio control source 111, devices within a cluster can communicate to a single device within that cluster which can serve as a gateway to other clusters and/or audio control source 111. In some embodiments, the present invention further comprising an in-ear monitoring device 112. According to an embodiment, the output devices 160 may include a power source 165 (such as, e.g., a battery or other suitable power source 160), a speaker 170, a communication mechanism 175 (such as, e.g., a wired and/or wireless transceiver), and/or any other suitable mechanisms (as shown in FIG. 1). According to an embodiment, the audio control source 111 includes a memory 180, a processor 182, an interface mechanism 184, and/or at least one input mechanism 186. According to an embodiment, the interface mechanism 184 is a graphical user interface with a display (e.g., a touch screen display). According to an embodiment, the at least one output device 160 is located within said at least one cluster 101, such that said audio control source 111 may alter the power supplied to said speaker 170 in real-time.

The embodiment depicted here shows devices that sense audio signal energy within the confines of a single cluster and then sends data directly to an audio control unit and other clusters. Therefore, not only can these computing devices wirelessly share sensed data with each other, but, also, data can be shared with an audio control source 111 (for audio output management purposes) and other devices in other clusters. Depending on the audio signal energy sensed within a specific cluster(s), audio control source 111 adjusts any connected output devices in either a single cluster, or multiple clusters to ensure high quality/fidelity output.

Figure 4:
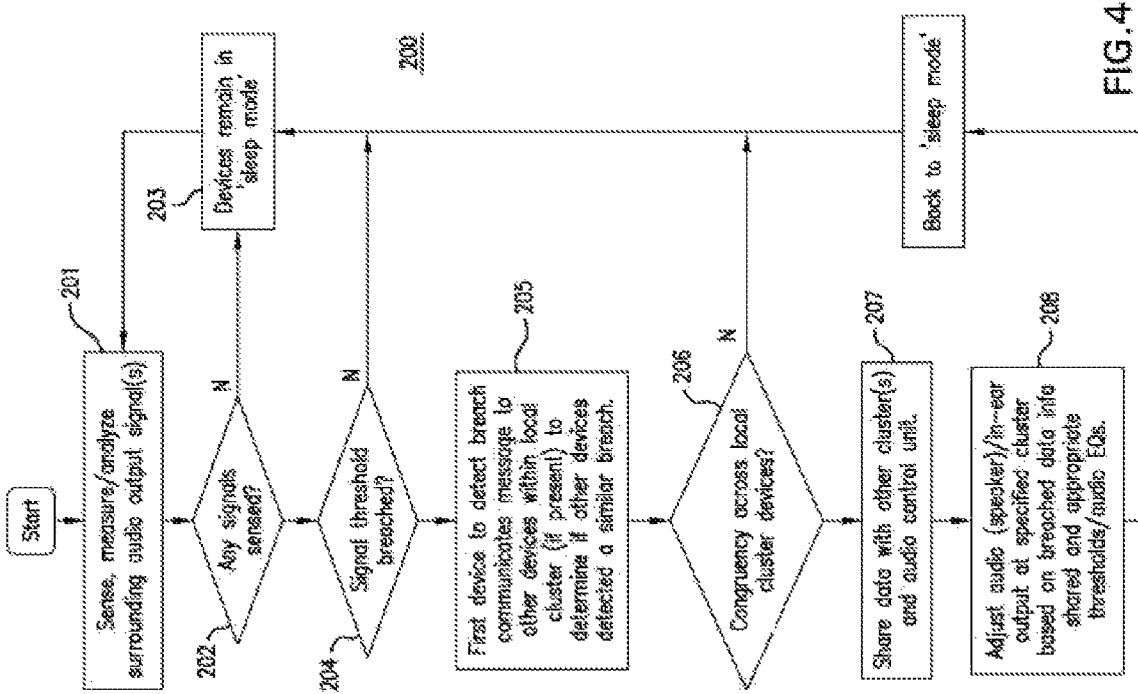
FIG. 4 depicts a block diagram of a flowchart of a method, according to at least some embodiments described herein.

FIG. 4 shows a flow chart outlining an embodiment of the method of the present invention. Here, method 200 is comprised of a number of steps. In step 201, initially, both desired and undesired audio output signals are sensed and subsequently analyzed. In step 202, the method proceeds to determine whether or not the input signals match a set of predefined thresholds. If there is only negligible output audio, that is, if the audio within an environment is outside of a specified frequency range, the method proceeds to step 203 where the devices in each cluster operate in sleep mode. If there is indeed sensible audio output, the method proceeds to step 204 where the present invention determines if the predefined threshold or EQ setting is breached. If this threshold is breached, the method moves to step 205 where the first device that sensed the breach will (preferably, wirelessly) communicate its signal measurements to other devices within its cluster and the receiving device will conduct the same audio measurements to confirm the threshold breach. Preferably, step 205 is repeated amongst all of the devices within a single cluster, to provide more robust data sets. Once the breach confirmation stage is completed, in step 206, the present invention moved to step 207 where at least one computing device is chosen to communicate the breach to. Finally, in step 208, when the present invention, via the audio control source, adjusts audio levels at the at least one output device to transform undesired audio outputs to desired audio outputs.

Figure 5:
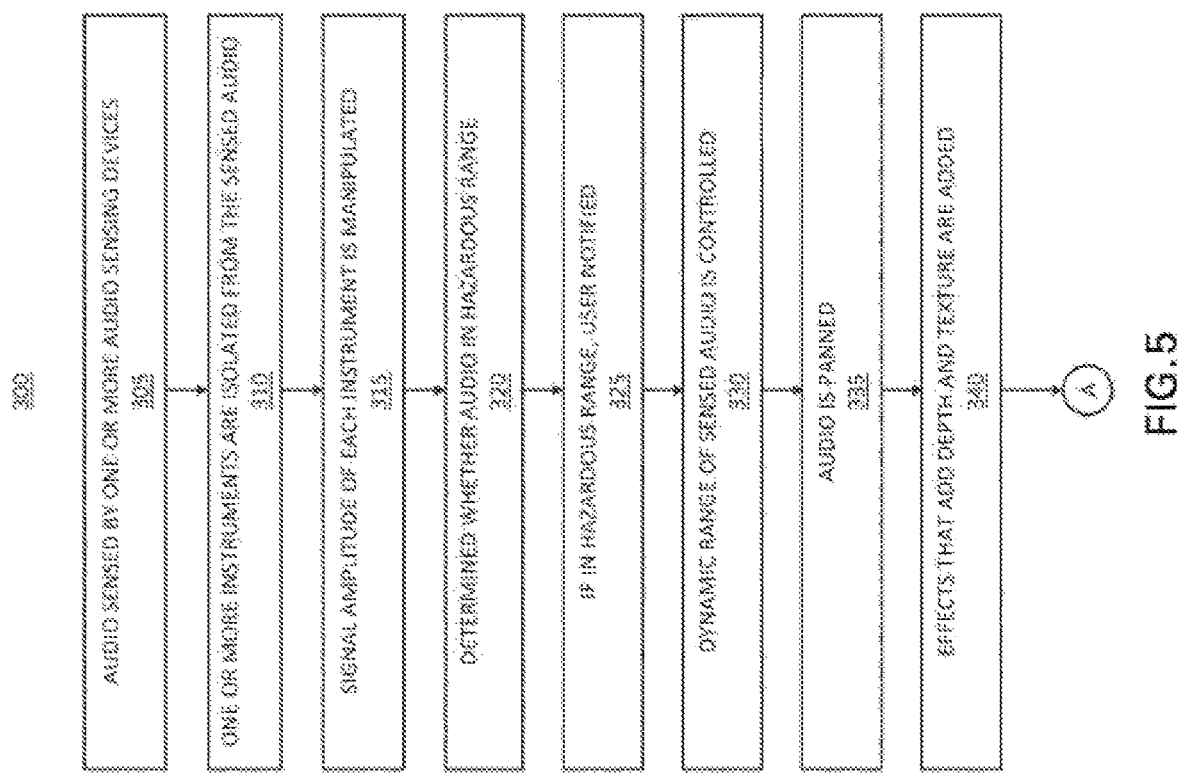
FIG. 5 depicts a block diagram of a flowchart of a method, according to at least some embodiments described herein.
Figure 6:
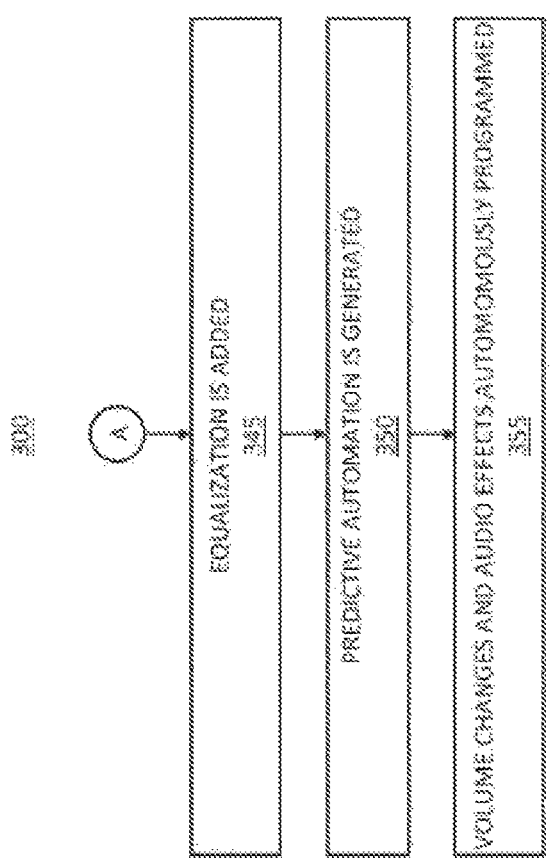
FIG. 6 depicts a block diagram of a flowchart of a method, according to at least some embodiments described herein.

Referring now to FIGS. 5-6, a flowchart 300 of an embodiment of the present invention is illustratively depicted, in accordance with an embodiment of the present invention.

According to an embodiment, the present invention isolates and/or separates sounds within band, reports findings of those sounds to a cloud-based system for audio signal processing (if necessary), and sends control commands to one or more commercial mixing consoles and/or audio control sources to alter the audio output (if necessary), and then communicate with apparatus devices to share and confirm sensed audio findings (if necessary). According to an embodiment, these sounds are associated with different frequencies and/or are associated with one or more instruments.

At step 305, audio/noise is sensed by one or more audio sensing devices. According to an embodiment, the one or more sensing devices are microphones.

At steps 310-315, the volume between the sensed audio is balanced. That is, one or more instruments and/or frequencies are identified and isolated from the sensed audio (at step 310), and the signal amplitude of each instrument is manipulated using a mixing console/audio source (at step 315). It is noted, however, that, at step 310, the identified sounds need not always be instruments. The sounds may be any suitable identifiable sounds, while maintaining the spirit of the present invention.

According to an embodiment, the present system may sense different types of phenomena (e.g., it may sense audio using an audio transducer such as a microphone, it may include a smartwatch and/or other similar device that may be able to sense ultrasonic waves using an ultrasonic transducer, and/or the system may incorporate one or more various suitable types of transducers). According to an embodiment, the system may be configured to sense environmental phenomena outside of the acoustic frequency range by using a variety of transducers. In those cases, the underlying functionality of the system generally remains the same, regardless of the input phenomena sensed. The system may measure the intensity of an acoustic wave, ultrasonic wave, infrasonic wave, and/or any other suitable waves.

According to an embodiment, the system may incorporate various input/output functions/details, such as those shown in Table 1. According to an embodiment, the system is configured to sense, analyze, and/or control audio outputs.

TABLE 1

| SYSTEM INPUT | SYSTEM FUNCTION | OUTPUT |
| --- | --- | --- |
| Network Interface: Sense audible sounds via mic or comparable audio sensing transducer | Apparatus will isolate/separate sounds within band, report findings to cloud-based system for audio signal processing (if necessary), send control commands to commercial mixing console and/or audio control source to alter audio output (if necessary) and communicate with apparatus devices to share and confirm sensed audio findings (if necessary) | Network Interface Configured to: Control mixing console(s) and/or an audio control source(s) via physical or SDR-based transceiver(s)** |
| 20-40 Hz | Sub Bass *(Piano, Synthesizer Strings) | kHz: 125/134 MHz: 13.56/600/ |

TABLE 1-continued

| SYSTEM INPUT | SYSTEM FUNCTION | OUTPUT |
| --- | --- | --- |
| 40-160 Hz | Bass Band (Drums, Strings, Winds, Vocals, Piano, Synthesizer) | 800/850/900/1700/1800/1900 2100/2200/L700/U700/2300/ |
| 160-300 Hz | Upper Bass Band (Drums, Strings, Winds, Vocals, Piano, Synthesizer) | 2400/2500/2700/3500/5200/ 5700/whitespaces between 54 and 860/ |
| 300-800 Hz | Low-Mid Band (Drums, Strings, Winds, Vocals, Piano, Synthesizer) | GHz: 3.6/4.9/5/5.9/24 to 300 300 GHz to 430 THz |
| 800-2.5 kHz | Mid-Range Band (Drums, Strings, Winds, Vocals, Piano, Synthesizer) | |
| 2.5-5 kHz | Upper Mid Band (Drums, Strings, Winds, Vocals, Piano, Synthesizer) | |
| 5-10 kHz | High Frequency Band (Drums - including Cymbals, Synthesizer) | |
| 10-20 kHz | Ultra-High Freq Bands (Hi-Hat, Cymbals, Hiss) | |

It is also noted that the present invention may further have implications in sensing and analyzing millimeter waves, which the human ear cannot hear. Higher-frequency millimeter-waves can possibly have adverse effects on human health. According to an embodiment, the present system can (as shown in Table 2), in real-time, detect and report harmful, high-energy level millimeter waves, which are included in many 5G deployment plans.

of the apparatus described herein. According to an embodiment, the present system can, in real-time, detect and report harmful infrasonic and ultrasonic devices in weaponized scenarios. According to an embodiment, the apparatus described can (as shown in Table 3), in real-time, detect and report harmful infrasonic and ultrasonic devices in weaponized scenarios.

TABLE 2

| SYSTEM INPUT | SYSTEM FUNCTION | OUTPUT |
| --- | --- | --- |
| Network Interface: Sense millimeter-waves via a mmWave transducer | Apparatus will detect, analyze, measure and/or report harmful millimeter-waves across several environments | Network Interface Configured to: Report/share data via physical or SDR-based transceiver(s)** |
| 24 to 300 GHz | Identify and measure millimeter-wave characteristics | kHz: 125/134 MHz: 13.56/600/800/850/900/ 1700/1800/1900 2100/2200/L700/U700/2300/ 2400/2500/2700/3500/5200/5700/ whitespaces between 54 and 860/ GHz: 3.6/4.9/5/5.9/24 to 300 300 GHz to 430 THz |

Weaponized infrasonic and ultrasonic devices with highly directional energy transmissions can produce both psychological and physical effects on humans. In addition, blue light (short wavelength) emitted from displays is harmful to the retina. For this reason, a light sensing transducer is a part

TABLE 3

| SYSTEM INPUT | SYSTEM FUNCTION | OUTPUT |
| --- | --- | --- |
| Network Interface: Sense infrasonic, ultrasonic waves, and/or light waves via an ultrasonic, infrasonic or electro-optical transducer | Apparatus will detect, analyze, measure and/or report on harmful ultrasonic or infrasonic waves across several environments | Network Interface Configured to: Report/share data via physical or SDR-based transceiver(s) |
| 18.9 Hz, 0.3 Hz, 7 Hz and 9 Hz 700 kHz to 3.6 MHz 20 to 200 kHz 400-770 THz | Identify and measure ultrasonic, infrasonic or visible wave characteristics | kHz: 125/134 MHz: 13.56/600/800/850/ 900/1700/1800/1900 2100/2200/L700/U700/2300 2400/2500/2700/3500/5200/ 5700/whitespaces between 54 and 860/ GHz: 3.6/4.9/5/5.9/24 to 300 300 GHz to 430 THz |

At step 320, it is determined whether the sensed audio includes any audio in frequencies that have been predetermined to be hazardous to human ears. According to an embodiment, if audio in the hazardous range has been detected, then one or more users are notified, at step 325. The notification may take the form of a visual notification, an audible notification, and/or any other suitable form of notification. It is noted, however, that, if automatically corrected, the user need not always be notified.

According to an embodiment, at step 330, the dynamic range of the sensed audio (compressed or limiting) is controlled by sending audio data to a mixing console/audio source or cloud-based system that can identify and mitigate sudden peaks in a sensed audio stream to help sound(s) sit consistently in an audio mix (accomplished by removing sudden peaks). Altering the dynamic range may also be used to eliminate any audio in the predetermined hazardous range. At step 335, the audio is panned. That is, like frequencies in the sensed audio are separated.

At step 340, effects that add depth and texture to audio outputs are added and, at step 345, equalization is added using subtractive and/or additive equalization techniques.

According to an embodiment, at step 350, automation is generated that predicts environmental conditions based on sensed data (like echoes and audio wind steers) and, at step 355, volume changes and audio effects are autonomously programmed, accordingly.

According to an embodiment, the present invention includes acoustic band applications. Consumer products, such as, e.g., wearables, smartphones, and other portable computing devices autonomously control sound output(s) in private spaces (e.g. cars and homes) and public spaces (e.g. transport stations and theater/concert venues). According to an embodiment, the present system senses audible sounds via a mic or comparable audio sensing transducer and isolates/separates sounds within certain bands, reports findings to cloud-based system(s) for audio signal processing, sends control commands to a commercial mixing console and/or audio control source to alter audio output, and communicates with cluster devices to share and confirm sensed audio findings. According to an embodiment, the present system outputs to control mixing console(s) and/or an audio control source(s) via physical or SDR-based transceiver(s).

According to an embodiment, the present system senses and analyzes audio frequencies across clusters to adjust and control audio output and perceived sound at a given locale. In order to achieve high-quality sound and sound equalization of a sonic presentation, a sound system's audio output levels are autonomously adjusted via a central audio mixing source using intelligent tell-tale frequency characteristics gathered from clusters comprised of smart devices and/or wearable computers.

According to an embodiment, the audio signal data obtained within clusters enables a system integrated mixing console to manage audio output based on detailed frequency descriptions of acoustic properties and characteristics across a venue, room, or vehicle. According to an embodiment, the present system incorporates a modular structure so that components can be added and expand as consumer needs grow.

According to an embodiment, the present system provides for an apparatus that is configured to adjust and control audio output signal levels across multiple cluster locales using computing devices such as smartphones and/or wearable computers; a wireless transmission platform; transceivers—software-defined, cognitive-defined and/or hardware-defined; wireless microphones; in-ear monitors—software-defined, cognitive-defined and/or hardware-defined; and a central audio mixing source.

According to an embodiment, the apparatus of the present invention may include, but is not limited to, the following functions:

Balancing the volume between sensed audio. For example, isolating instruments based on frequency and manipulating the signal amplitude of each instrument using a mixing console/audio source.

Controlling the dynamic range of the sensed audio (compress or limiting) by sending audio data to a mixing console/audio source or cloud-based system that can identify and mitigate sudden peaks in a sensed audio stream to help sounds sit consistently in an audio mix (accomplished by removing sudden peaks).

Panning.

Adding effects that add depth and texture to audio outputs.

Equalization using subtractive/additive equalization techniques.

Automation that 1) predicts environmental conditions based on sensed data (like echoes and audio wind steers) and 2) autonomously programs volume changes and audio effects accordingly.

Figure 7A:
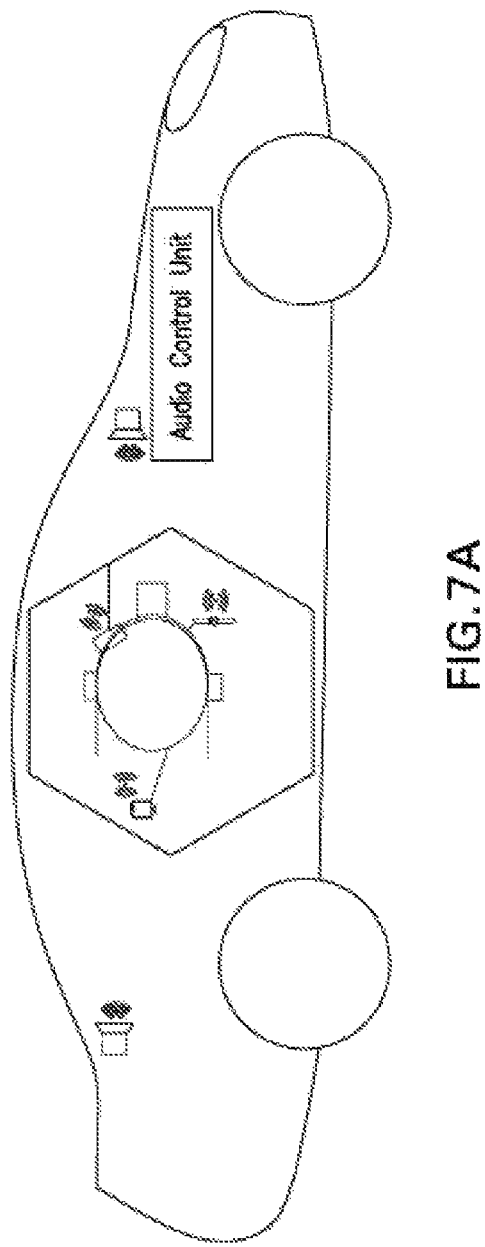
FIG. 7A depicts an illustrated embodiment of the present invention located in an automobile, according to at least some embodiments described herein.
Figure 7B:
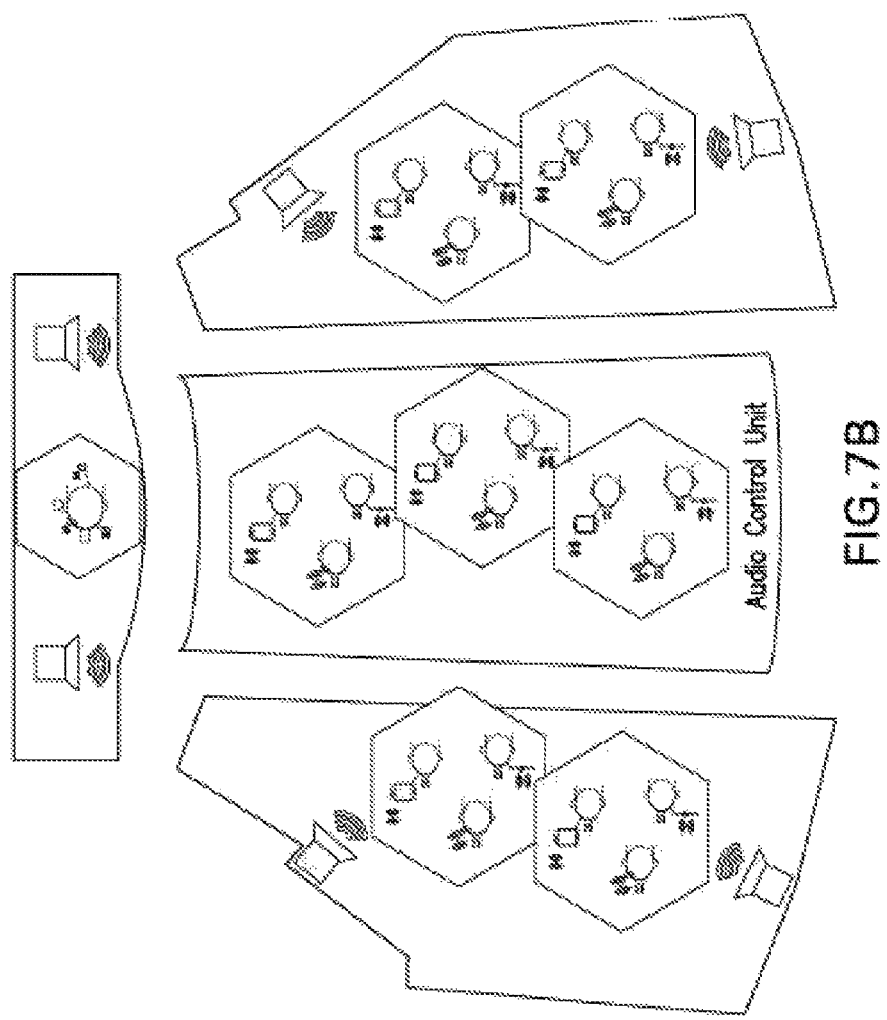
FIG. 7B depicts an illustrated embodiment of the present invention located in an indoor theatre, according to at least some embodiments described herein.

Referring to FIGS. 7A-7C, various embodiments of the present invention implemented in an automobile, an indoor theatre, and an outdoor stadium, respectively, are shown. While these venues are particularly suited for the present invention to be implemented in any venue in which there are multiple listeners.

In a preferred embodiment, the sound sensing mechanisms (preferably, transducers) used within each "sensing" computer/device outputs an output signal that is fed into the input of an ADC. In the configurations described in FIGS. 7A, 7B and 7C, a single-ended ADC interface can be used effectively since ADCs and the transducer source are both located on the same integrated circuit board. However, since fully differential interfaces have performance gains over single-ended inputs due to its inherent noise rejection characteristics, using a fully-directional interface instead of a single-ended interface may be desirable.

Figure 8:
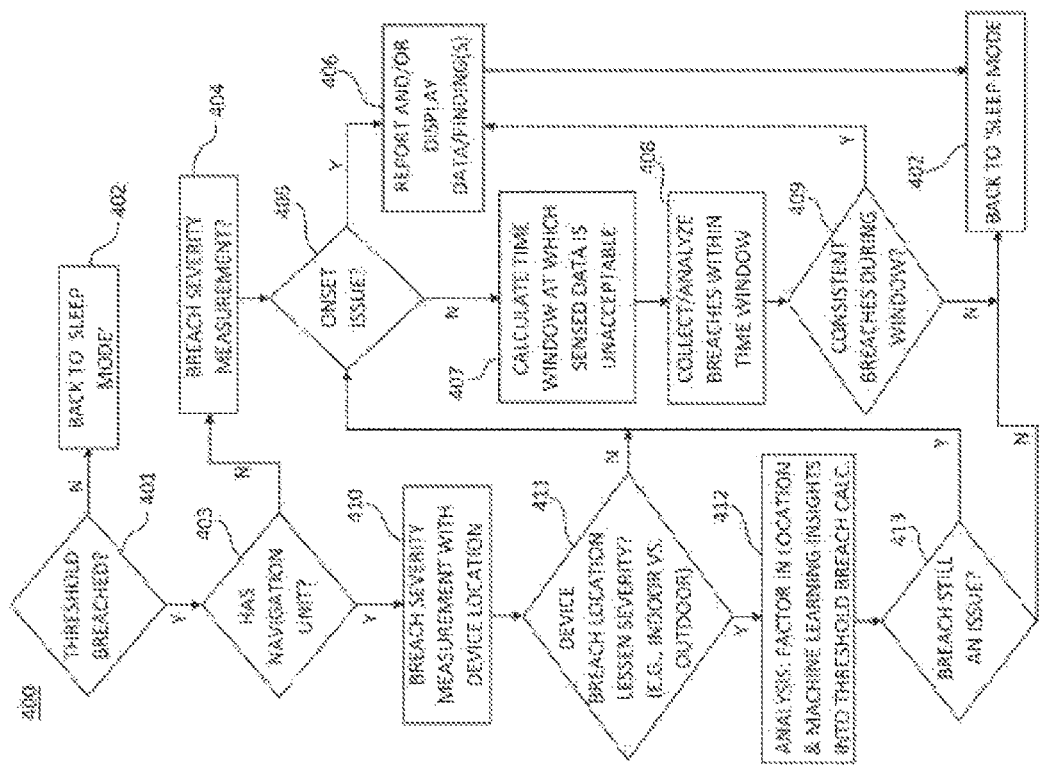
FIG. 8 depicts a block diagram of a flowchart of a method, according to at least some embodiments described herein.

FIG. 8 shows a flow chart outlining an embodiment of the method of the present invention. Here, method 400 is comprised of a number of steps. According to an embodiment, the method as shown and described in FIG. 8 showcases the method steps of a system that measures the intensity of phenomena and its purpose is to sense, analyze, report, and, in some cases, control invisible phenomena. These invisible phenomena can include, e.g., ultrasonic waves, audio waves, infrasonic waves, mm waves etc. (using ultrasonic transducers, infrasonic transducers, microwave transducers, among others, and associated software for these applications).

As in method 200 of FIG. 4, initially, both desired and undesired audio output signals are sensed and subsequently analyzed. It is then determined whether or not the input signals match a set of predefined thresholds. If there is only negligible output audio, that is, if the audio within an environment is outside of a specified frequency range, the devices in each cluster operate in sleep mode, step 402. If there is indeed sensible audio output, the method proceeds to step 401 where the present invention determines if the predefined threshold or EQ setting is breached. If this threshold is not breached, the device operates in sleep mode 402. If this threshold is breached, the method moves on to step 403, where it is determined whether the device has a navigation unit. According to an embodiment, devices in the system can auto-awaken out of sleep mode based on the location of the device (e.g. when a user walks into a concert venue, the system will begin measuring surrounding signal energy).

If the device does not have a navigation unit, the method moves to step 404, where a breach severity measurement is determined. Once the breach severity measurement is determined, the method moves to step 405, where it is determined whether there is an onset issue.

If there is an onset issue, the method moves to step 406, in which any data and/or findings are reported and/or displayed. Once the data and/or findings are reported and/or displayed, the device returns to sleep mode, step 402.

If there is not an onset issue, the method moves to step 407, wherein a time window is calculated at which any sensed data was determined to be unacceptable. Once this time window is calculated, the method moves to step 408, wherein breaches within the calculated time window are collected and/or analyzed. Once the breaches within the calculated time window are collected and/or analyzed, the method moves to step 409, wherein it is determined whether there were consistent breaches during the time window. If there were consistent breaches during the time window, the method moves to step 406. If there were not consistent breaches during the time window, the device goes back to sleep mode, step 402.

If the device has a navigation unit, the method moves to step 410, wherein breach severity measurements with the device's location are determined. Once the breach severity measurements with the device's location are determined, the method moves to step 411, wherein it is determined whether the device's location at the time of the breach lessened the severity of the breach. If the device's location at the time of the breach did not lessen the severity, the method moves to step 405, wherein it is determined whether there is an onset issue. If the device's location at the time of the breach did lessen the severity, the method moves to step 412, wherein an analysis takes place in which location and machine learning insights are factored into the threshold breach calculations. The method then moves to step 413, where it is determined if the breach is still an issue. If the breach is still an issue, the method moves to step 405, wherein it is determined whether there is an onset issue. If the breach is not still an issue, the device goes back to sleep mode, step 402.

According to an embodiment, environmental measurements may be skewed depending on the device's location (e.g., in a bag, in a pocket, etc.). According to an embodiment, the location of the device is detected, and, in these cases, the system will either account for signal degradation in the measurement or disable environmental measurements based on predefined thresholds. According to an embodiment, smart devices (e.g., smartphones, etc.) will use an accelerometer and/or light sensor and/or a temperature sensor to detect whether or not the smart device is directly exposed to phenomena (i.e. whether or not the device is in a bag or pocket).

The instant invention further describes methods for collecting and managing public music performance royalties and royalty payouts. On the listeners side, song/audio fingerprint data is collected using the method and apparatus described in U.S. Pat. No. 10,127,005 and U.S. patent application Ser. No. 16/421,141, the contents of which are hereby fully incorporated by reference. On the rights owner side, verified song/audio data is received from the listeners side and royalty payments are, in some cases, automated. Public performance royalty payments are based on data (e.g., the song/audio fingerprint data) collected by listeners/clients and business logic servers.

The instant invention further describes a system that facilitates and modernizes the way music performing rights royalties are earned, processed, and managed. The system includes IoT/smart devices (e.g., a first smart or wearable device 508A, a second smart or wearable device 508B, a third smart or wearable device 508C, and/or a fourth smart or wearable device 508D of FIG. 9) and interfaces with a cloud-based (or local) system that is administered by a third party. In some examples, the third party is a music publishing entity. However, the third party is not limited to such.

The example system also includes a song/sound fingerprint/data unit identifiable by a third party administrator. The third party administrator is provided information that details whether the song in a given environment is being sung, played live, or recorded. The third party administrator is also given information regarding a time and location of the data unit. The third party administrator autonomously issues royalty payments to the appropriate musical source and/or company. As defined herein, the "rights owner" refers to a songwriter, a lyricist, a composer, a musical company, and/or a publisher of a musical work. All payments are based on the data units received from the IoT/smart devices and performance rights information associated with the musical work. The third party administrator authorizes and issues the royalty payment based upon receiving the data units from the system. The IoT/smart devices, the song/sound fingerprint/data unit, and the system are further described in U.S. patent application Ser. No. 16/421,141 and U.S. Pat. No. 10,127,005, the contents of which are hereby fully incorporated by reference.

Figure 9:
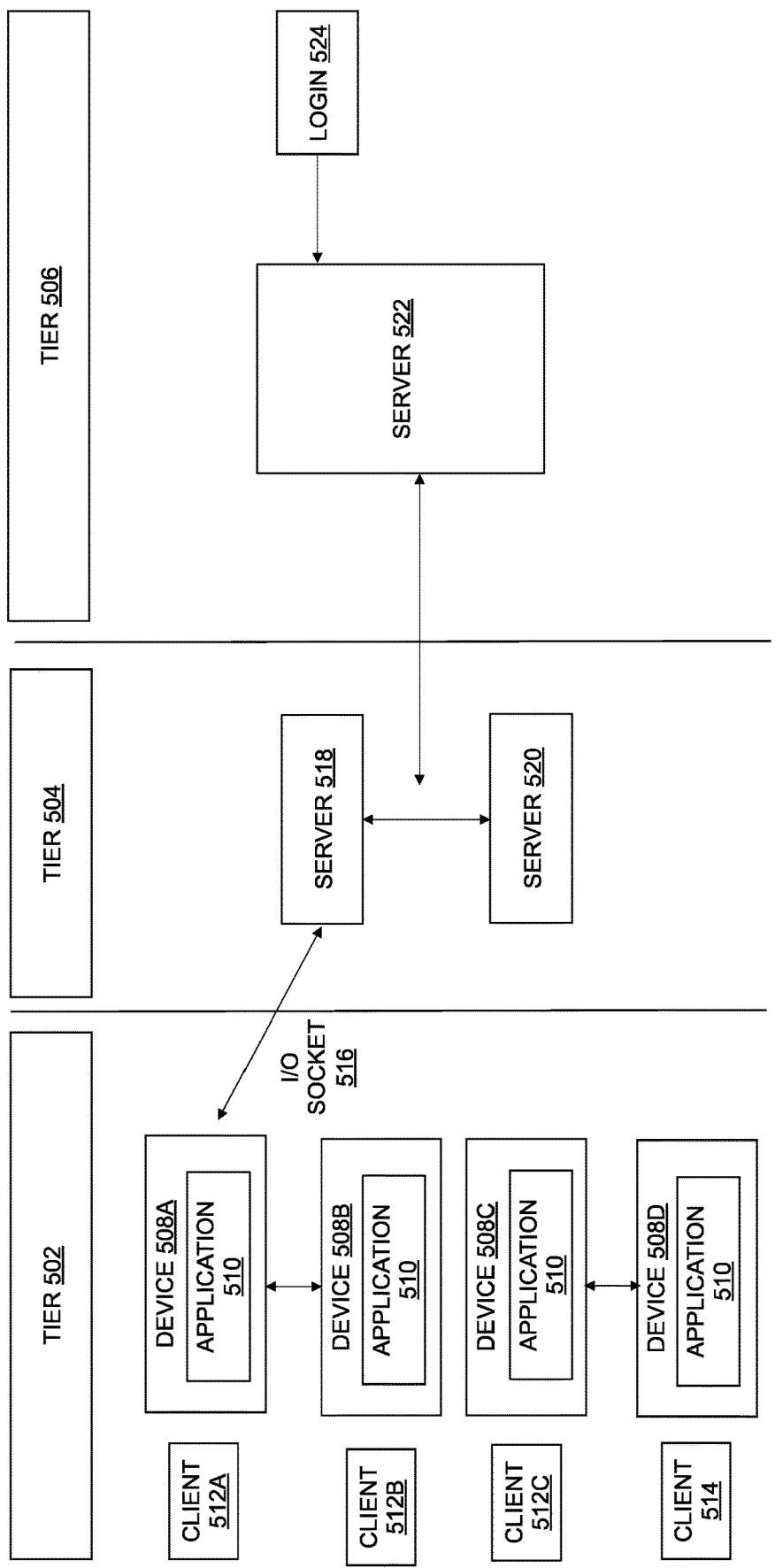
FIG. 9 depicts a tiered diagram of a system, according to at least one embodiment described herein.

FIG. 9 depicts a tiered diagram of a system, according to at least one embodiment described herein. The tiered diagram includes a first tier 502, a second tier 504, and a third tier 506, which may communicate with one another. The first tier 502 is a listener/client tier, the second tier 504 is a business logic tier, and the third tier is a rights owner tier 506.

The first tier 502 may include a first smart or wearable device 508A having an application 510 executable thereon. The first smart or wearable device 508A may be associated with a first client 512A (or user). In some examples, the first tier 502 may additionally include a second smart or wearable device 508B having the application 510 executable thereon, which may be associated with a second client 512B and a third smart or wearable device 508C having the application 510 executable thereon, which may be associated with a third client 512C. Additionally, the first tier 502 may include a fourth smart or wearable device 508D having the application 110 executable thereon, which may be associated with a local administrator client 514, if present. In examples, the first smart or wearable device 508A, the second smart or wearable device 508B, the third smart or wearable device 508C, and/or the fourth smart or wearable device 508D may be an IoT device, a smart device, or a wearable device.

The first smart or wearable device 508A may be configured to communicate with the second smart or wearable device 508B and/or the third smart or wearable device 508C, if present. The second smart or wearable device 508B and/or the third smart or wearable device 508C may communicate with the fourth smart or wearable device 508D, if present. In examples, the first smart or wearable device 508A of the first tier 502 is configured, via an input/output (I/O) socket 516, to communicate with a business logic server 518 of the second tier 504. The second tier 504 may also include a rules, rights, and policy server 520. The business logic server 518 is further configured to communicate with the rules, rights, and policy server 520.

The business logic server 518 of the second tier 504 is configured to perform multiple processes, such as: retrieving musical acts and/or song information and/or audio or sound fingerprint data from rights owners and/or publishers; acting as a third party song repository and/or a custom-built song database; mapping collected data to rights owner; and/or verifying songs. The rules, rights, and policy server 520 may be associated with United States and/or foreign territories, and may be configured to: store copyright laws and rules tied to royalty and royalty payouts across various territories.

The third tier 506 may include a rights owner server 522, as well as a login 524 capability. The rights owner server 522 is configured to: combine data from the first tier 502, the second tier 504, and/or the third tier 506; process and appropriate royalty payments; distribute royalty payouts to financial institutions (e.g. banks or similar entities); and/or produce public performance royalty statements and/or reports.

An example method executed by the business logic server 518 of FIG. 9 for collecting and managing public performance royalties and royalty payouts includes numerous process steps, such as: receiving data units associated with a musical work from a device (e.g., the first smart or wearable device 508A) associated with a user (e.g., the first client 512A). Each of the data units may include: song information, information regarding whether a song was sung, information regarding whether a song was played live, information regarding whether a song was recorded, information regarding a time of the data unit, and/or information regarding a location of the data unit, among other information.

The method may further include receiving, by the business logic server 518, an authorization from the user (e.g., the first client 512A) to share the data units with a third party administrator. In some examples, the authorization from the user (e.g., the first client 512A) is an opt-in agreement. In response to receiving such authorization, the business logic server 518 is configured to map the received data units to a database comprising information to identify a rights owner of the data units. The information of the database may include audio or sound fingerprint recognition information, licensing grant information, performance information, song catalog information, song ownership information, and/or a location or a jurisdiction associated with a royalty payment for the data units, among other information.

The method may then include verifying the rights owner. Verification of the rights owner may include mobile-to-mobile checks. In other examples, the verification may include verification by the third party administrator. The method may further include transmitting, by the business logic server 518, a verification message to the rights owner server 522 to facilitate a payment (e.g., a royalty payment) to the rights owner. The verification message is not limited to any format and may include textual, graphical, and/or audio data.

In an example where the information of the database comprises the performance information, the method may further include: mapping, by the business logic server 518, the data units to the performance information to identify a non-musical entity associated with the data units. In examples, the non-musical entity may be a venue commercializing musical works. The method may further include: verifying the non-musical entity and transmitting, by the business logic server 518, another verification message to the rights owner server 522 to facilitate the payment (e.g., the royalty payment) to the non-musical entity.

In a further example, the method may include: mapping, by the business logic server 518, the data units to the rules, rights, and policy server 520 comprising copyright laws of a territory, verifying compliance with the copyright laws of the territory, and transmitting, by the business logic server 518, another verification message to the rights owner 522 server to facilitate payment to a copyright holder. In examples, the copyright holder is a music producer, songwriter, recording artist and/or other rights owner or holder (e.g. publishers).

An example system contemplated herein for collecting and managing public music performance royalties and royalty payouts includes numerous components, which may be depicted, at least, in FIG. 9. The system may include a device (e.g., the first smart or wearable device 508A) associated with a user (e.g., the first client 512A), a database comprising information associated with a musical work, the business logic server 518 communicatively coupled to the rules, rights and policy server 520, and the rights owner server 522 communicatively coupled to the business logic server 518 and the rules, rights and policy server 520. The information of the database may include audio or sound fingerprint recognition information, licensing grant information, performance information, song catalog information, song ownership information, and/or a location or a jurisdiction associated with a royalty payment for the data units.

The business logic server 518 is configured to: receive the data units associated with the musical work from the device (e.g., the first smart or wearable device 508A) associated with the user (e.g., the first client 512A) and receive an authorization (e.g., an opt-in agreement) from the user (e.g., the first client 512A) to share the data units with a third party administrator. The business logic server 518 is further configured to: map the data units to the database to identify a rights owner of the data units and verify the rights owner.

The business logic server 518 may also map the data units to the rules, rights, and policy server 520 comprising copyright laws of a territory and verify compliance with the copyright laws of the territory. The business logic server 518 may then transmit a verification message of the rights owner server 522 to facilitate the payment (e.g., the royalty payment) to the rights owner and a copyright holder (e.g., a publisher).

In an example where the information of the database comprises the performance information, the business logic server 518 is further configured to: map the data units to the performance information to identify a non-musical entity associated with the data units (e.g., a venue commercializing musical works), verify the non-musical entity, and transmit another verification message to the rights owner server 522 to facilitate the payment (e.g., the royalty payment) to the non-musical entity.

In examples, the payment to the rights owner, the copyright holder, and/or the non-musical entity are based on the data units, compliance with the copyright laws of the territory, and the performance rights associated with the musical work. In examples, the rights owner server 522 may also generate royalty statements or reports based on the royalty payment and/or location-based public performance activity reports.

Figure 10:
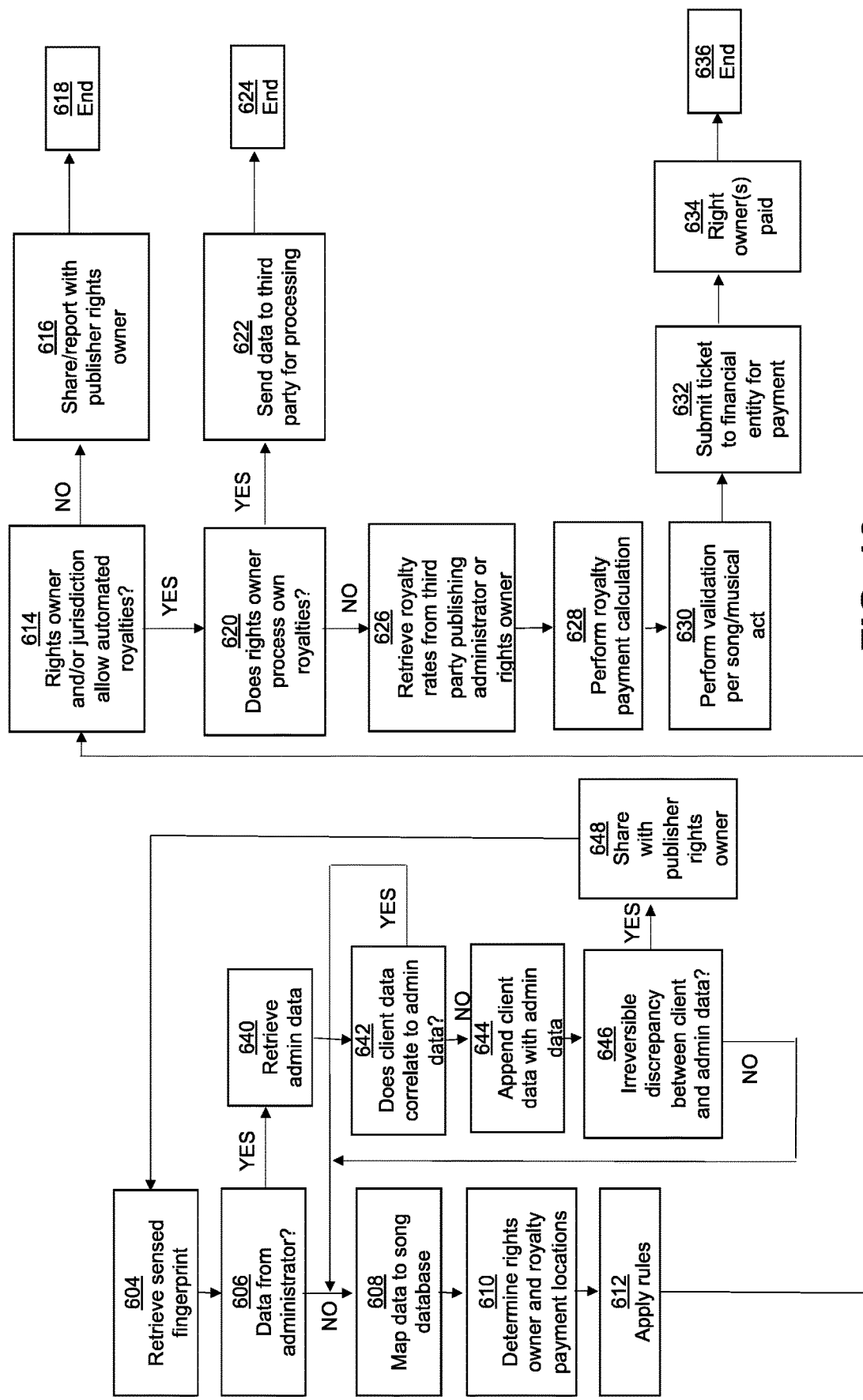
FIG. 10 depicts a block diagram of a flow chart of a method for collecting and managing public music performance royalties and royalty payouts, according to at least one embodiment described herein.

FIG. 10 depicts a block diagram of a flow chart of a method for collecting and managing public music performance royalties and royalty payouts, according to at least one embodiment described herein.

The method of FIG. 10 begins at a process step 604, which includes retrieving the sensed audio or sound fingerprint from a device (e.g., the first smart or wearable device 508A) of a user (such as the first client 512A of FIG. 9). A process step 606 may follow the process step 604, which includes assessing whether the audio or sound fingerprint data is received from an administrator. A response to the process step 606 may include a "YES" or a "NO" response.

The "YES" response to the process step 606 may lead to flagging the audio or sound fingerprint data with a "yes data" administrative flag. Subsequent this, a process step 640 may occur. The "NO" response to the process step 606 may lead to flagging the audio or sound fingerprint data with a "no data" administrative flag. Subsequent this, a process step 608 may occur.

The process step 608 may include mapping the audio or sound fingerprint data to a database. The database may comprise information, such as: audio fingerprint recognition information, licensing grant information, performance information, song catalog information, song ownership information (including the rights owner of the audio or sound fingerprint data), and/or a location or a jurisdiction associated with the rights owner of the audio or sound fingerprint data for a royalty payment. A process step 610 may follow the process step 608, which includes determining the rights owner and the location or the jurisdiction associated with the rights owner of the audio or sound fingerprint data for the royalty payment from the information in the database.

A process step 612 follows the process step 610, which includes applying one or more rules to the information. The rules that may be applied are non-exhaustive. A process step 614 follows the process step 612, which includes assessing whether the rights owner and/or the location or the jurisdiction allow for automated royalties. A first response to the process step 614 is a "NO" response, which leads the process to a process step 616. The process step 616 includes sharing and/or reporting such information to the rights owner. A process step 618 follows the process step 616 to end the process.

A second response to the process step 614 is a "YES" response, which leads the process to a process step 620. The process step 620 includes assessing whether the rights owner is capable of processing their own royalties. A first response to the process step 620 includes a "YES" response, which leads to a process step 622. The process step 622 includes transmitting the data to a third party for processing. A process step 624 follows the process step 622 to end the process.

A second response to the process step 620 includes a "NO" response, which leads to a process step 626. The process step 626 that includes retrieving royalty rates from a third party administrator or the rights owner. A process step 628 follows the process step 626 and includes performing royalty payment calculations for the rights owner. The royalty payment calculation methods are non-exhaustive. A process step 630 follows the process step 628 and includes validating the identification of the rights owner, the location and/or the jurisdiction, the royalty payment calculation, and/or previous information. In examples, the validation for this step may occur for each song and/or for each musical act.

A process step 632 follows the process step 630 and includes submitting a ticket or a report to a financial entity (e.g., a bank) for a payment to the rights owner. The payment may include a royalty payment. However, the payment is not limited to this example. The process step 632 is followed by a process step 634 that includes transmitting the payment (e.g., the royalty payment) to the rights owner. A process step 636 follows the process step 634 and ends the process.

In response to a "YES" to the process step 606, a process step 640 includes retrieving administrative data from a database. A process step 642 follows the process step 640 and includes assessing whether the audio and sound fingerprint data from the client correlates to the administrative data. A first response to the process step 642 is a "YES" response. The "YES" response to the process step 642 brings the process to the process step 608.

A second response to the process step 642 is a "NO" response. The "NO" response to the process step 642 results in a process step 644. The process step 644 includes appending the audio and sound fingerprint data from the client with the administrative data. A process step 646 follows the process step 644 and includes assessing if there are any irreversible discrepancies between the audio and sound fingerprint data from the client and the administrative data. A first response to the process step 646 is a "YES" response, which leads to a process step 648. The process step 648 includes transmitting any irreversible discrepancies between the audio and sound fingerprint data from the client and the administrative data with the rights owner. Subsequent the process step 648, the process is brought to the process step 604. A second response to the process step 646 is a "NO" response, which leads to the process step 608, where the process is continued.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made, and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

What is claimed is:

1. A system for collecting and managing public music performance royalties and royalty payouts, the system comprising:
   a device associated with a user;
   a database comprising information associated with a musical work;
   a business logic server communicatively coupled to a rules, rights and policy server; and
   a rights owner server communicatively coupled to the business logic server and the rules, rights and policy server,
   the business logic server being configured to:
      receive data units associated with the musical work from the device associated with the user;
      receive an authorization from the user to share the data units with a third party administrator;
      map the data units to the database to identify a rights owner of the data units;
      verify the rights owner;
      map the data units to the rules, rights, and policy server comprising copyright laws of a territory;

verify compliance with the copyright laws of the territory; and transmit a verification message of the rights owner server to facilitate a royalty payment to the rights owner and a copyright holder.

2. The system of claim 1, wherein each of the data units are selected from the group consisting of: song information, information regarding whether a song was sung, information regarding whether a song was played live, information regarding whether a song was recorded, information regarding a time of the data unit, and information regarding a location of the data unit.

3. The system of claim 1, wherein the information of the database is selected from the group consisting of: audio fingerprint recognition information, licensing grant information, performance information, song catalog information, song ownership information, and a location or a jurisdiction associated with the royalty payment for the data units.

4. The system of claim 3, wherein the information of the database comprises the performance information, and wherein the business logic server is further configured to:

map the data units to the performance information to identify a non-musical entity associated with the data units, wherein the non-musical entity is a venue commercializing musical works;

verify the non-musical entity; and transmit another verification message to the rights owner server to facilitate the royalty payment to the non-musical entity.

5. The system of claim 1, wherein the device associated with the user comprises a smart device, a wearable device, and/or an IoT device.

6. The system of claim 1, wherein the verification of the rights owner comprises verification by the third party administrator.

7. The system of claim 1, wherein the rights owner is selected from the group consisting of: a songwriter, a lyricist, a composer, a musical company, and a publisher of the musical work, and wherein the copyright holder is a creator of the musical work or an assigned entity.

\* \* \* \* \*